(12) United States Patent
Craft

(10) Patent No.: US 6,907,569 B1
(45) Date of Patent: Jun. 14, 2005

(54) "SHOW ME" USER INTERFACE COMMAND WITH SCROLL TRACKING

(75) Inventor: Daniel H. Craft, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 453 days.

(21) Appl. No.: 09/697,734

(22) Filed: Oct. 25, 2000

(51) Int. Cl.[7] .............................................. G06F 17/00
(52) U.S. Cl. ...................... 715/708; 715/709; 715/785; 715/772; 715/818; 715/859; 345/688; 345/689
(58) Field of Search ................................. 715/684, 817, 715/688, 772, 689, 818, 859, 705–709, 784–786, 515, 528–529, 531, 539, 540; 345/784–786, 689, 684, 688, 338, 817–818, 859, 772, 728, 341

(56) References Cited

U.S. PATENT DOCUMENTS

| | | | |
|---|---|---|---|
| 5,532,715 A | | 7/1996 | Bates et al. |
| 5,774,109 A | * | 6/1998 | Winksy et al. ............... 345/685 |
| 5,802,516 A | * | 9/1998 | Shwarts et al. ................ 707/6 |
| 5,815,138 A | * | 9/1998 | Tsubaki et al. ............. 345/857 |
| 6,026,409 A | * | 2/2000 | Blumenthal .............. 707/104.1 |
| 6,268,854 B1 | * | 7/2001 | Borden et al. ............... 345/786 |
| 6,335,730 B1 | * | 1/2002 | Gould ......................... 345/784 |
| 6,421,064 B1 | * | 7/2002 | Lemelson et al. .......... 345/638 |

OTHER PUBLICATIONS

Screen Dumps of Microsoft Word 2999 (pp. 1–3, 1999).*
Ann Fatton et al; "The Paper Model for Computer–Based Writing", Proceedings of ACM INTERCHI '93 Conference on Human Factors in Computing Systems, 1993m p. 514.

Beard et al.; "Navigational Techniques to Improve the Display of Large Two–Dimensional Spaces", Behavior and Information Technology, 1990 v. 9, n. 6, pp. 451–466.

Arai et al.; "Window System with Leafing Through Mode: Book Window", Proceedings of ACM CHI '92 Conference on Human Factors in Computing Systems, 1992, pp. 291–292.

Okada et al.; "Scrolling or Leafing Through: Book Window", First Moscow International HCI '91 Workshop Proceedings, 1991, pp. 242–248.

V. Kaptelinin; "A Comparison of Four Navigation Techniques in a 2D Browsing Task", Proceedings of ACM CHI '95 Conference of Human Factors in Computing Systems, 1995, v. 2, pp. 282–283.

* cited by examiner

Primary Examiner—Kristine Kincaid
Assistant Examiner—Le Nguyen
(74) Attorney, Agent, or Firm—Fish & Richardson P.C.

(57) ABSTRACT

Methods and apparatus, including computer program products, for displaying a document on a display device. Methods include receiving a user input selecting a location in a document displayed in a display pane and requesting a show-me operation, and, in response to the input, displaying a visual reference mark indicating the selected location in the pane, then smoothly scrolling the document and the reference mark in the pane until the selected location is at a target location in the pane, and then removing the visual reference mark.

13 Claims, 2 Drawing Sheets

"SHOW ME" USER INTERFACE COMMAND WITH SCROLL TRACKING

BACKGROUND

The invention relates to facilitating a user's ability to read electronic document content on a display device such as a computer monitor.

The term "content" encompasses a wide variety of information including text, images, multimedia presentation, or any combination of them. Computer program applications are widely used to display and manipulate such content. A user of a computer system can access content that is stored locally or remotely. Computer systems generally provide a graphical user interface (GUI) that provides windows of the kind that allow applications to display content in a display pane. Tools that allow the user of a computer to move comfortably through the text of an electronic document or an image display are important and are included in various forms in GUI applications. Reading on a computer display requires eye movement. The process becomes more challenging when the reading requires following the displayed text movement if text is scrolled to reveal the previously unseen text. When the text displayed on the computer screen is scrolled, the user must follow the movement of the text to know where the reading had left off before continuing the reading of the now visible text.

A number of techniques currently exist for scrolling text. Most commonly, text is scrolled by jumping to the next screenful of text. The displayed text disappears and the new text appears. Another technique is scrolling one line at a time and thus moving text until it reaches the top of the screen. In another technique, the user drags the scrollbar. This technique becomes cumbersome when working with a large document because it increases already highly sensitive scrollbar movement. It is also possible to drag the text or the image. This typically requires a significant mouse movement as the drag often traverses most of the height of the screen. It also may introduce a problem inadvertently changing the horizontal alignment of the page any time the page is wider than the window as a hand drag tool typically drags in both the x- and the y-directions.

SUMMARY

The invention facilitates a user's ability to view and understand a document being. viewed on an electronic display. Because the invention combines smooth-scrolling and a visual indicator, a user is easily able to differentiate between previously read and unread portions of the document. Although most generally applicable to text documents, the invention is also applicable to documents containing graphic and multimedia objects.

In response to a user input requesting a "show me" operation, a visual indication is added to the displayed text as a reference mark at a point selected by the user. This indicator is intended to delineate the previously read part of the document from a further portion of the document. The document is then smooth-scrolled until the location in the document that was selected by the user is at or close to a target location. If the location has text, the text is displayed. If the location has a graphic or multimedia object, the object is optionally displayed in a way appropriate to the size and nature of the object.

Thus, the invention provides methods and apparatus, including computer program. products, for displaying a document on a display device. Methods include receiving a user input selecting a location in a document displayed in a display pane and requesting a show me operation, and, in response to the input, displaying a visual reference mark indicating the selected location in the pane, then smoothly scrolling the document and the reference mark in the pane until the selected location is at a target location in the pane, and then removing the visual reference mark.

Particular implementations can include on or more of the following features. The user input selects a location corresponding to a line of text. The user input selects a location corresponding to a graphic object. The user input selects a location corresponding to a video object. The user input can point to a text location in the document, draw the reference mark as a reference line perpendicular to a scrolling direction and intersecting the text location and smoothly scroll the document and the reference line to the target location, the target location being close to a start edge of the pane. The target location is within two text lines of the start edge of the pane. A line of text at the selected location is highlighted at about the time the location is selected and used as the reference mark; alternatively, the highlighting is supplemental to the reference mark. Highlighting can be of any conventional kind, such as reverse colors, addition of a color background, or changing font style or size, for example.

The invention can be implemented to realize one or more of the following advantages. It provides a quick and efficient speed of the movement that is cognitively easy for the user to follow. The user does not have to maintain his focus and uninterrupted attention on the screen and apply manual manipulation while the read text is moving. The invention provides for the movement slow enough to permit the scrolling of the document to be followed by the eyes. Consequently, it makes it easy for the user to preserve context while reading. The invention does not make use of the scrollbar and is not affected by the sensitivity of the scrollbar movement, especially when working with a large document.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
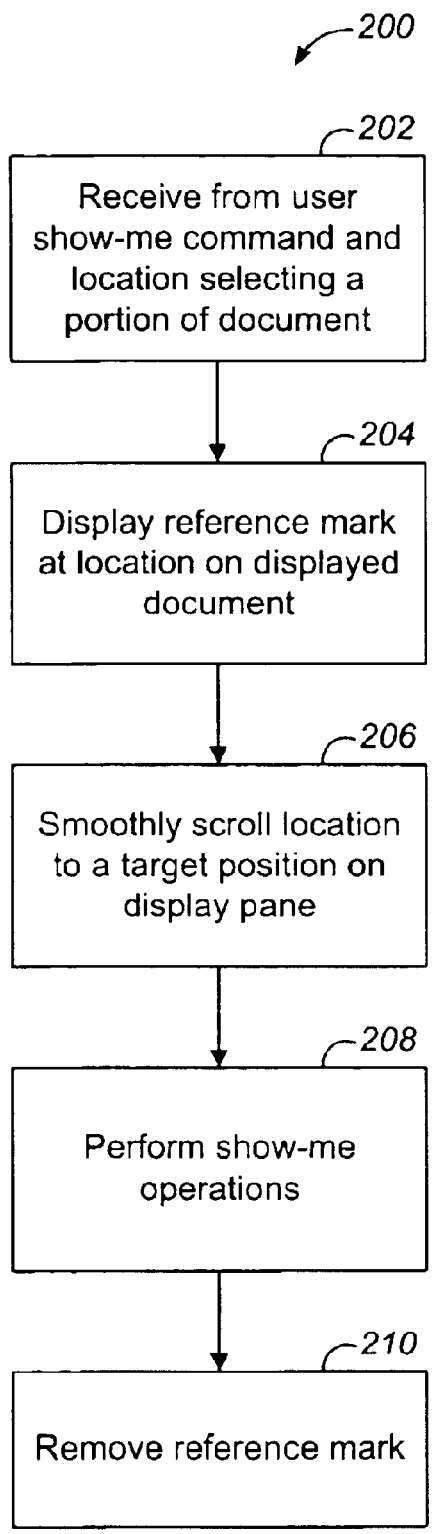
FIGS. 1 and 2 are flowcharts of processes in accordance with the invention.

As shown in FIG. 1, a system operating in accordance with the invention in displaying an electronic or digital document performs a process 200 in response to a user command. Generally, the process will be implemented in a computer program application, such as a document viewer application, as will now be described.

Initially, the application receives a "show me" command from a user indicating the user's desire to view a portion of the document (step 202). Such a desire can arise, for example, when the user starts to read a new paragraph. Although the user is not necessarily at the bottom of the pane in which the document is being displayed, the user is mentally changing contexts. Therefore, this is a logical point for the user to stop reading, for the application to update the display of the document, and for the user then to resume reading.

In entering the command, the user selects a portion of the document by selecting a location in the document. This can be done by a variety of ways, such as by pointing and clicking with a pointer device such as mouse. Alternatively, the user can select the location by keystroke on a keyboard, or by a combination of a pointer and keyboard. The show me command can be entered by one or more keystrokes entered in conjunction with a selection action, or by a sequence of keystroke and/or pointer device actions. The selected location can be in a line of text, between lines of text, in a graphic objects, in a multimedia object (such as a video clip), in a linking object such as a hypertext link, or in any other kind of object that may be found in an electronic document.

In response, the application marks the selected location or object with a visual indicator or reference mark (step 204). The reference mark can be generated in a variety of ways, including artifacts overlaid on the document and temporary modifications of the displayed appearance of the document. Possible modifications include modifying the document background, foreground, or a combination of these. The reference mark can be any visible indicator inserted into or adjacent to the already-existing content of the document. The mark can be made using any graphical symbol, text style or text that can act as a reference mark. For example, if text is displayed, the process can overlay a blue line on the document at the location selected by the user in a direction perpendicular to the line-to-line reading direction to allow for various text configurations. If the selected portion is a graphic object or a video clip, a display area for the object or clip in the document can be surrounded or-otherwise delimited by a reference mark artifact.

Next, the application smoothly scrolls the content and the visual indicator across the display pane until the selected location is close to a target location (step 206). The scrolling is performed at a smooth pace, slow enough that the user can visually follow the content and the reference mark as it is moving. It is advantageous to scroll at the fastest speed that users can easily follow and that provides an appearance of smooth rather than jerky motion.

The target location can be preset by the application or it can be set by the user as a user preference. The target location can be defined in terms of a document scrolling or flow direction (e.g., top to bottom or right) in which the document is naturally read. The target location can differ depending on the nature of the portion selected by the user. For example, the target location if text is selected can be one text line away from the starting edge of the display pane (according to the flow direction), while the target location for a multimedia video clip can be at the very top of the display or even a new pane created for the clip.

After the smooth scrolling, the application performs any operations required to show the user the selected portion, according to the nature of what the user selected (step 208). A particular set of such operations will be described in reference to FIG. 2. If a new window is the target location and is opened to show the selected portion, both the scrolling and showing can be done essentially simultaneously. In general, however, the scrolling will be done first.

When, or shortly after, the smooth scrolling is completed, the reference mark is removed from the display (step 210) and the process 200 is finished.

Figure 2:
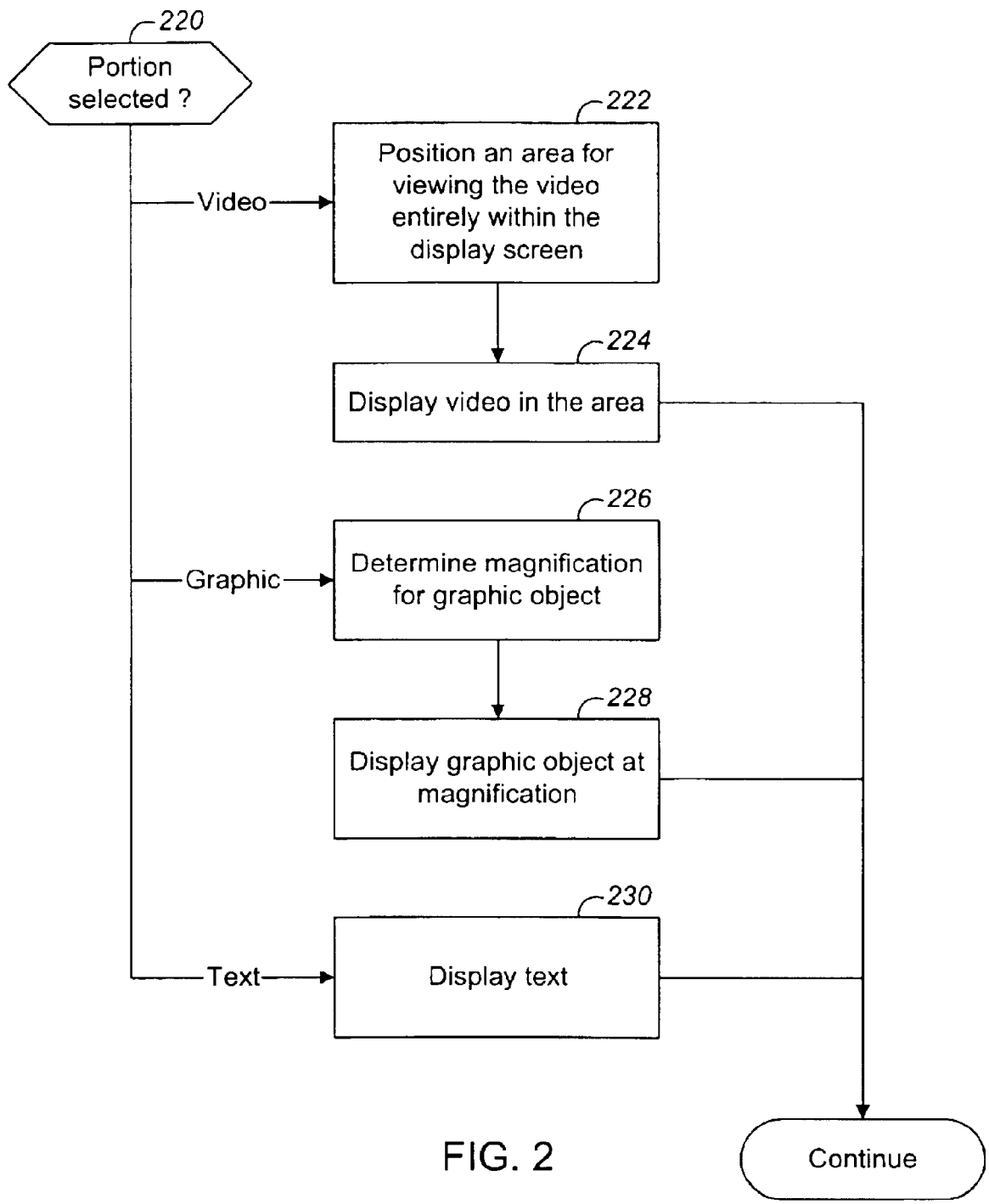

FIG. 2 shows one set of operations that can be implemented to perform step 208 of FIG. 1. According to the nature of the selected portion (decision step 220), different operations can be performed to show the selected portion to the user.

If the user selects a video object, for example, an area is defined at the target location for displaying the selected video (step 222). According to the target location defined by the application or by the user, the area can be within the pane displaying the document, or in a separate pane. The target location definition can also define a default size for the video display area. The video is then displayed in the area (step 224).

If the user selects a graphic object, such as a vector or raster artwork object, for example, the application optionally determines a magnification for the object (step 226). By default, the magnification may be determined by the magnification of the document as it is .being displayed. Generally, the target location of a graphic object will be within the display area of the document and not in a separate pane, although the option of a separate pane for a graphic object can be provided. The user can optionally define a minimum, maximum, and preferred size of display for a graphic object, as well as a minimum and maximum magnification. The user can optionally specify a preference for viewing graphic objects with no change in size from the size displayed with the rest of the document. The object is displayed at the target location according to any constraints defined by the user or application (step 228).

The application can be implemented to recognize as a special case the case of a graphic object that contains text. For this case, magnification can be determined so that the displayed object is enlarged at least so much as to show the contained text at a desired size. For example, if the primary size for the contained text is 6 point and the desired text size is 10 point, the correct magnification would be 1.67. To achieve this magnification, the might have to fit as much of the object as would fit in the display pane, adding scroll bars to the window if the image did not fit. Alternatively, such a graphic object can be magnified and displayed as described earlier.

If the selected portion is document text or white space associated with text, the application simply displays the text as and after scrolling the document to the target location (step 230).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of displaying a document on a display device, comprising:

receiving a user input selecting a location in a document displayed in a display pane and requesting a show-me operation, wherein the selected location is located in a portion of the document that is visible within the pane and wherein the show-me operation is an operation that scrolls the document and during scrolling, displays a visual reference mark that tracks the movement in the pane of the selected location as the selected location scrolls toward a target location in the pane, thereby enabling the user to more easily find the selected location once the scrolling stops; and, in response to the input, performing the show-me operation by performing the following operations without further user input:

displaying a visual reference mark at the selected location;

then smoothly scrolling the document and the reference mark in the pane toward the target location in the pane, at a rate that allows the user to follow the movement of the document and the reference mark in the pane, and stopping the scrolling when the selected location and the reference mark are at the target location in the pane; and then removing the visual reference mark from the selected location.

2. The method of claim 1 wherein the user input selects a location corresponding to a line of text.

3. The method of claim 1 wherein the user input selects a location corresponding to a graphic object.

4. The method of claim 1 wherein the user input selects a location corresponding to a video object.

5. A computer program product, tangibly stored on a computer-readable medium, for displaying a document on a display device, comprising instruction operable to cause a programable processor to:

receive a user input selecting a location in a document displayed in a display pane and requesting a show-me operation, wherein the selected location is located in a portion of the document that is visible within the pane and wherein the show-me operation is an operation that scrolls the document and during scrolling, displays a visual reference mark that tracks the movement in the pane of the selected location as the selected location scrolls toward a target location in the pane, thereby enabling the user to more easily find the selected location once the scrolling stops; and, in response to the input, performing the show-me operation by performing the following operations without further user input:

displaying a visual reference mark at the selected location;

then smoothly scrolling the document and the reference mark in the pane toward the target location in the pane, at a rate that allows the user to follow the movement of the document and the reference mark in the pane, and stopping the scrolling when the selected location and the reference mark are at the target location in the pane; and then removing the visual reference mark from the selected location.

6. The product of claim 5, wherein:

the user input selecting a location in the document includes user input pointing to a location of text in the document; and the reference mark is displayed as a reference line perpendicular to a scrolling direction and intersecting the text location.

7. The product of claim 6, wherein the target location is within two text lines of a start edge of the pane.

8. The product of claim 5, further comprising instructions to:

apply highlighting to a line of text at the selected location at about the time the location is selected, the highlighting being the reference mark.

9. The product of claim 5, further comprising instructions to:

apply highlighting to a line of text at the selected location at about the time the location is selected, the highlighting being supplemental to the reference mark; and remove the highlighting no later than when the reference mark is removed.

10. The method of claim 1, wherein:

the user input selecting a location in the document includes user input pointing to a location of text in the document; and the reference mark is displayed as a reference line intersecting the text location and perpendicular to a text scrolling direction.

11. The method of claim 1, wherein the target location is within two text lines of a start edge of the pane.

12. The method of claim 1, wherein the target location is close to a start edge of the pane.

13. The product of claim 5, wherein the target location is close to a start edge of the pane.

* * * * *

UNITED STATES PATENT AND TRADEMARK OFFICE
CERTIFICATE OF CORRECTION

PATENT NO. : 6,907,569 B1
DATED : June 14, 2005
INVENTOR(S) : Daniel H. Craft

Page 1 of 1

It is certified that error appears in the above-identified patent and that said Letters Patent is hereby corrected as shown below:

Column 5,
Line 39, delete "of" and replace with -- further --.

Signed and Sealed this

Twenty-seventh Day of September, 2005

JON W. DUDAS
*Director of the United States Patent and Trademark Office*